United States Patent [19]

Stubbings

[11] E Re. 30,645

[45] Reissued Jun. 16, 1981

[54] METHOD AND APPARATUS FOR CUTTING SHEET METAL WRAPPERS OR THE LIKE

[75] Inventor: James H. Stubbings, Rockville, Md.

[73] Assignee: Potomac Applied Mechanics, Inc., Bethesda, Md.

[21] Appl. No.: 55,370

[22] Filed: Jul. 6, 1979

Related U.S. Patent Documents

Reissue of:

[64] Patent No.: 4,070,890
Issued: Jan. 31, 1978
Appl. No.: 648,776
Filed: Jan. 13, 1976

[51] Int. Cl.[3] ..... B26D 5/30; B21F 11/00

[52] U.S. Cl. ..... 72/129; 83/27; 83/71; 83/406; 83/425.4; 83/917; 83/560; 83/516

[58] Field of Search ..... 83/917, 925 CL, 44, 83/406, 71, 405, 425.4, 560, 433, 437, 522, 516; 72/129

[56] References Cited

U.S. PATENT DOCUMENTS

| | | | |
|---|---|---|---|
| 2,102,170 | 12/1937 | Stern | 83/917 |
| 2,179,461 | 11/1939 | Yoder | 72/129 |
| 2,369,617 | 2/1945 | Somerville | 83/516 X |
| 2,732,867 | 1/1956 | May et al. | 144/128 |
| 3,752,027 | 8/1973 | Gerber et al. | 83/917 |
| 3,766,813 | 10/1973 | Pearl | 83/917 |
| 3,950,189 | 4/1976 | Lange | 83/516 X |
| 3,982,457 | 9/1976 | Berry | 83/917 X |

*Primary Examiner*—Willie G. Abercrombie
*Attorney, Agent, or Firm*—Cushman, Darby & Cushman

[57] ABSTRACT

A method and apparatus for automatically cutting wrappers or the like from metal sheets. A metal sheet is conveyed in the x-direction to a cutting position wherein a pair of cutting blade (i.e., shears) assemblies cut edge portions from the metal sheet to form a cut wrapper or the like having longitudinal edges. The cutting assemblies are movable in the y-dimension—transverse to the x-direction—and are also angularly movable. From the cutting position the cut wrapper is continuously conveyed to a notching position wherein notching assemblies also movable in the y-dimension may form notches in the longitudinal edges of the cut wrapper. At a further point in the x-direction, an edge deforming position may be provided including edge deforming apparatus that also is movable in the y-dimension. Flexible elongated members or the like support the metal sheet spaced from its conveyor during conveying to prevent damage to the conveyor by the cutting or notching assemblies.

20 Claims, 6 Drawing Figures

METHOD AND APPARATUS FOR CUTTING SHEET METAL WRAPPERS OR THE LIKE

Matter enclosed in heavy brackets [ ] appears in the original patent but forms no part of this reissue specification; matter printed in italics indicates the additions made by reissue.

BACKGROUND AND SUMMARY OF THE INVENTION

The invention relates to a method and apparatus for the cutting of sheet metal "wrappers" automatically. In forming ductwork and the like sheet metal wrappers are joined together with each other, elbows, junctions, and other structures to form desired structures. In my copending application Ser. No. 630,894, filed Nov. 11, 1975, now U.S. Pat. No. 4,047,457, entitled "Sheet Metal Cutting", the disclosure of which is hereby incorporated by reference in the present application, apparatus and a method for cutting pattern pieces for forming ductwork and the like was disclosed. The method and apparatus of the present invention is intended to allow automatic cutting of wrappers and the like for cooperation with the pattern pieces that may be cut according to the invention of my copending application, in order to form all ductwork components and the like automatically. Under some circumstances, other pieces besides wrappers could be cut according to the present invention, such as special pattern pieces. Hence, the term "wrappers or the like" is employed. While prior proposals have been made for the automatic cutting of sheet material in general (i.e., see U.S. Pat. Nos. 3,511,124 and 3,790,154), suitable automatic means for cutting sheet metal wrappers have not heretofore been proposed.

According to the present invention, conveying means carry a metal sheet from which a wrapper will be cut is conveyed in an x-direction into operative relationship with a pair of cutting assemblies, which assemblies each provide a sheet metal cutting arrangement that is movable in a y-dimension (generally transverse to the x-direction) and angularly ($\alpha$) movable. The cutting assemblies cut off side exterior portions from the metal sheet, leaving cut longitudinal edges of a wrapper. Supporting means are provided associated with said conveying means for supporting the metal sheet on the conveying means so that no damage is done to the conveying means by the cutting means (or subsequently by notching means).

As the metal sheet moves in the x-direction past the cutting position, notching assemblies are moved into cooperating relationship with the longitudinal edges thereof, and by operation of a die selecting means and a punch, notches of any given size or shape are punched in the wrapper adjacent the longitudinal edges thereof. After notching, the wrapper leaves the conveying means and may be engaged and propelled by suitable edge deforming which deform the longitudinal edges of the wrapper to any desired extent for future cooperation with other metal sheets to form a desired finished product. Computer control means or the like control the operation of all the component parts of the apparatus according to the present invention to provide for integrated operation thereof, and to produce wrappers of any given shape.

It is the primary object of the present invention to provide for automatic sheet metal wrapper production. This and other objects of the invention will become clear from an inspection of the detailed description of the invention, and from the appended claims.

DETAILED DESCRIPTION OF THE INVENTION

Figure 1:
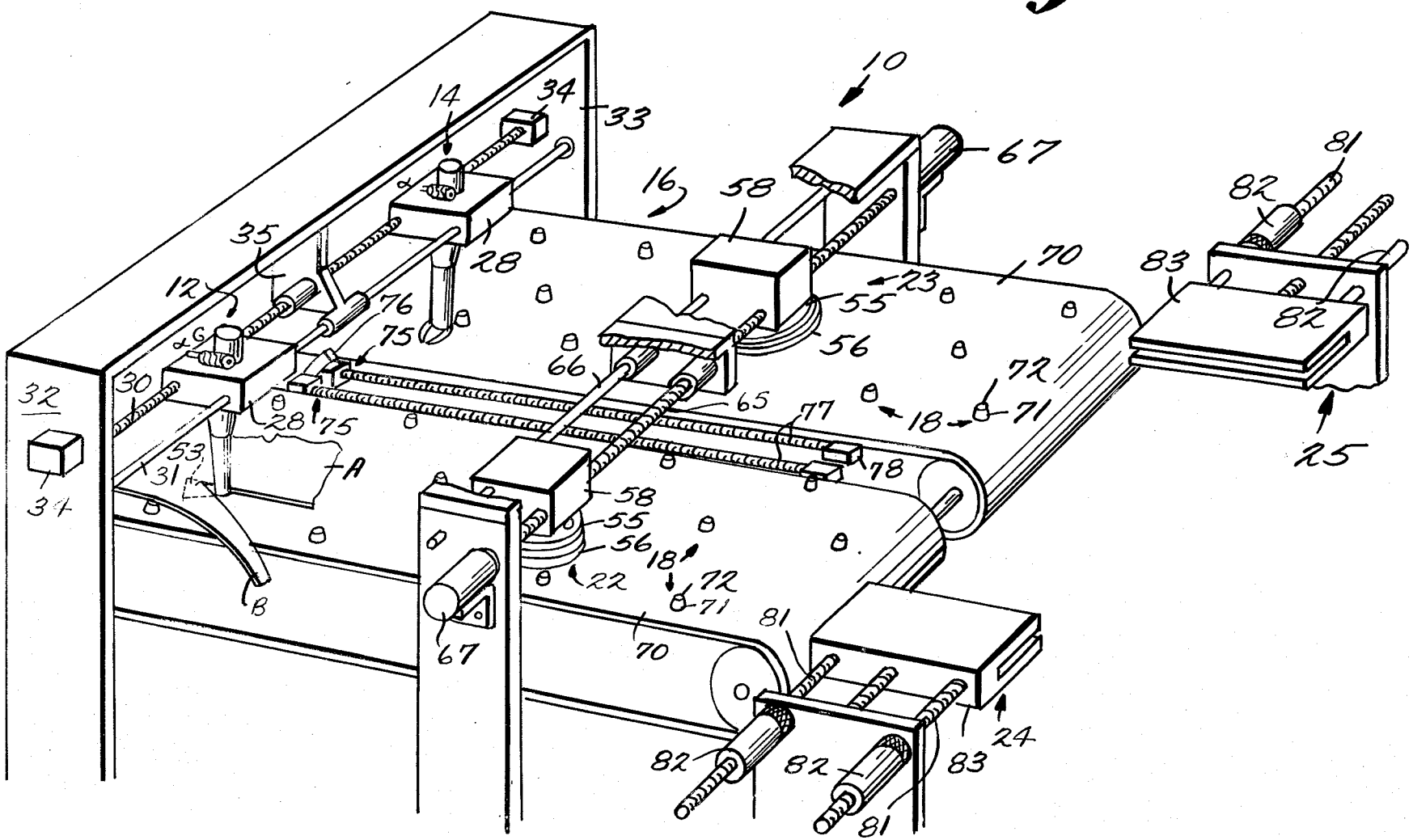
FIG. 1 is a perspective view of exemplary apparatus according to the present invention.

Exemplary apparatus according to the present invention for cutting wrappers C from metal sheets A is shown in general at 10 in FIG. 1. The apparatus 10 includes several main components—a pair of cutting assemblies 12, 14, conveying means 16 for bringing a metal sheet A into operative cutting relationship with said cutting assemblies 12, 14, supporting means 18 for spacing a metal sheet carried by said conveying means 16 from the conveying means and for preventing damage to the conveying means by said cutting assemblies 12, 14, and computer control means 20 or the like (see FIG. 5) for automatically controlling operation of said cutting assemblies 12, 14. Additionally, a pair of notching assemblies 22, 23, and a pair of longitudinal edge (F) deforming means 24, 25, may be provided for acting on wrapper C portions cut from a metal sheet by said cutting assemblies 12, 14.

Each cutting assembly 12, 14 includes a cutting blade assembly 27 mounted to a support 28. The support is mounted for linear movement substantially in the y-dimension, generally transverse to the direction of movement (x-direction) of a metal sheet to be cut by the apparatus 10. Means for mounting the support 28 for linear movement in the y-dimension generally include a threaded rotatable rod 30 passing through the support 28, and a non-rotatable guide rod (or rods) 31 also passing through the support 28. The rods 30, 31 are mounted to side frame members 32, 33, and also to an intermediate frame member 35. A y-motor 34 is provided for each of the screw rods 30 for controlling the position thereof in the y-dimension. Means are provided with support 28 for transferring the rotational movement of rod 30 into linear movement of the support 28 in the y-dimension.

Figure 2:
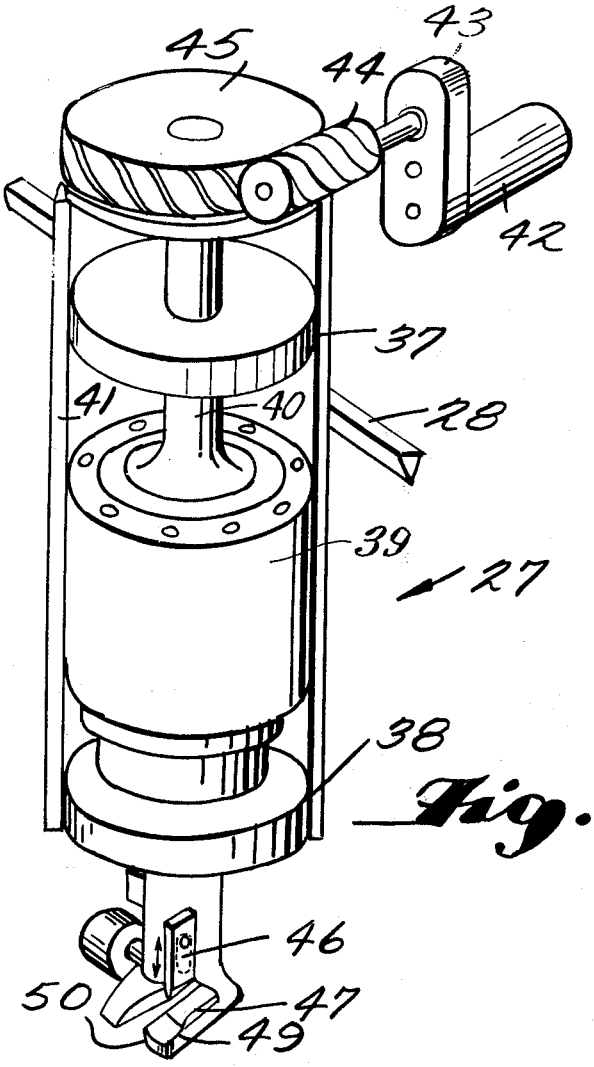
FIG. 2 is a perspective view with portions cut away of an exemplary shear cutter that may be utilized in the apparatus of FIG. 1.
Figure 3:
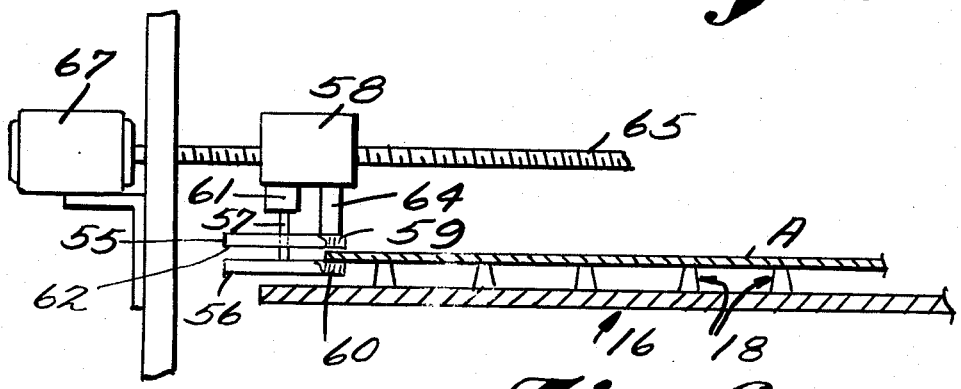
FIG. 3 is a side view of a notcher assembly, in cooperation with a metal sheet, that may be used in the apparatus of FIG. 1.

Each cutting blade assembly 27 is also mounted for angular movement, $\alpha$, with respect to the support 28. As shown in FIG. 2, this may be provided by bearings 37, 38 which mount a cutting motor 39 for the blade assembly 27, and main shaft 40 thereof in a casing 41 that is rigidly connected to support 28. An $\alpha$-motor 42 is provided mounted on support 28 for rotating the cutting blade assembly 27 with respect to the support 28. The $\alpha$-motor may act on the assembly 27 through a gear reduction means 43, worm gear 44, and circular gear 45 mounted on shaft 40 exterior of casing 41. The blade assembly may be mounted for 360° movement if desired, however in practice, less than 180° movement is required for normal cutting of wrappers from metal sheets.

The blade assembly 27 may be like that shown in my copending application Ser. No. 630,894, filed Nov. 11, 1975, entitled "Sheet Metal Cutting", the disclosure of which is hereby incorporated by reference herein. Such an assembly 27 may include a pair of blade members 46, 47 for shearing a metal sheet A received therebetween, blade member 46 being disposed above a horizontally arranged piece of sheet metal to be cut, and blade member 47 being disposed below the sheet metal. A reciprocating shaft (not shown) operatively connected to cutting motor 39 moves blade 46 up and down (as shown by the arrows in FIG. 2) to shear the metal sheet disposed between it and lower blade member 47. An arm 49 mounts blade member 47, and the arm 49 has a leading portion 50 thereof which engages supporting means 18 for moving them out of interfering relationship with the blade assembly 27. A ball bearing may also be provided to insure ease of turning of the blade assembly during cutting. Other details and modifications are discussed in my copending application Ser. No. 630,894. The cutting assembly 12 is a left-hand cutting assembly (as shown in FIG. 2), while the cutting assembly 14 is a right-hand cutting assembly.

As the metal sheet A to be cut is moved past the cutting assemblies 12 and 14 by conveying means 16, the exterior portions B thereof that are severed from the main wrapper section C being cut, fall (are peeled) downwardly from the cutting position. Accessory means may also be provided for assisting in moving the cut material B into a scrap bin or the like. Such accessory means may comprise a conventional wedge assembly (or deflecting plate)—illustrated in dotted line at 53 in FIG. 1—such as is provided on Black and Decker shear model No. 3205.

Figure 6:
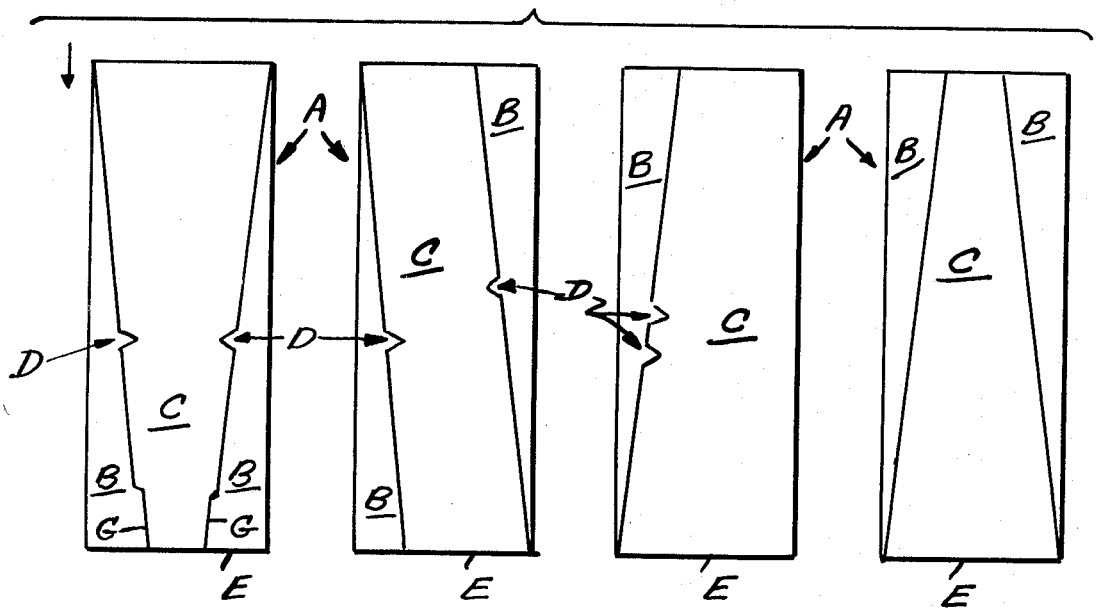
FIG. 6 is a plan view of exemplary wrappers that may be cut with apparatus according to the present invention.

Located downstream of the cutting assemblies 12, 14 in the x-direction, are the pair of notching assemblies 22, 23, which are utilized to place notches at given points along the longitudinal edges F of the wrappers C being cut, such notches being shown at D (see FIG. 6). Each notching assembly 22, 23 comprises a pair of vertically spaced plates 55, 56 for receiving a metal sheet A therebetween. The plates are mounted by a rotatable shaft 57 to a support member 58. The effective distance between the plates 55, 56 may be varied to compensate for metal sheets A of varying thickness by inserting shims therebetween. Each upper plate 55 may have a plurality of dies 59 or the like associated therewith for punching notches of different size and shape in the metal sheet A, and the bottom plates 56 each having a number of openings 60 or the like therein of a size and shape conforming to the size and shape of the die 59 cooperating with the opening 60. In this way a die 59 will cleanly punch a notch D of a given size and shape in the metal sheet A, and the plug so punched will pass through the corresponding opening 60. A motor 61 rigidly connected to support 58 cooperates with shaft 57 to rotated plates 55, 56 to a desired position depending upon which size and shape notch is desired. The motor 61 may be self-indexing, or other suitable indexing means may be provided for properly moving a given die 59 and cooperating opening 60 into place. It is also noted that a bevel 62 may be provided on the plates 55, 56 to assist entry of a longitudinal wrapper edge F therebetween.

A punch 64, such as a conventional air-punch, is rigidly mounted to support 58 above plate 55 for cooperation with a die 59 of plate 55 placed therebeneath. Any suitable air supply may provide power for the punch, and operation of the punch 64 will be coordinated by computer control means 20 or the like with motor 61. The support 58 is also mounted for linear movement generally in the y-dimension, and the mounting means therefor may be substantially the same as that for the cutting assemblies 12, 14—that is screw rods 65, guide rods 66, and motors 67 for rotating the screw rods 65 may be provided. The motors 67 are also controlled by the computer control means 20 or the like.

Figure 4:
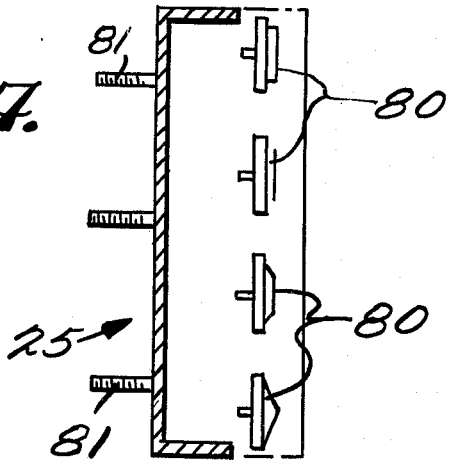
FIG. 4 is a schematic view, with top cover cut away, of a Pittsburg machine that may be utilized in the apparatus of FIG. 1.

The conveying means 16 preferably comprises one or more conveying belts 70 which are mounted below cutting assemblies 12, 14 and notching assemblies 22, 23, the belts extending from a position before cutting assemblies 12, 14 in the x-direction to a termination point after assemblies 22, 23 in the x-direction, and just before the edge deforming means 24, 25. When a pair of conveyor belts 70 are provided, as shown in FIG. 1, they may be mounted for relative movement with respect to each other to accommodate metal sheets A of varying width, such as shown in FIG. 4 of my copending application Ser. No. 630,894, filed Nov. 11, 1975, the disclosure of which is hereby incorporated by reference in the present application. The conveyor belt(s) 70 include the supporting means 18 thereon, which supporting means 18 preferably include a plurality of elongated flexible members 71, preferably in the shape of truncated cones, which support a piece of sheet metal A on the top surfaces 72 thereof, yet which may be deflected out of the way of the cutting assemblies (by members 50 thereof) and out of the way of the notching assemblies (by plates 56 thereof) during cutting and notching. Such members 71 are described in more detail in my above-mentioned copending application (see FIG. 4 of my copending application in particular).

It is also noted that if desired, a pair of pin members 75 or the like could be provided for assisting in moving the metal sheet A into operative engagement with the cutting and notching assemblies. Such pin means 75 could take the form of pin members 76 that may be cammed out of the way of the sheet A when it is moved in the x-direction but yet will remain upright and engage the back of the sheet A for movement thereof in the x-direction. Such pin means 75 may be like the means 34 shown in my above-mentioned copending application, each including a screw-rod drive 77 therefor, and a motor 78 for rotating the screw-rod 77.

The longitudinal edge deforming means 24, 25 may take the form of conventional Pittsburg machines, or conventional quarter-inch edging machines, depending upon the manner in which the edges are to be deformed to eventually cooperate with similar deformations on other metal pieces when a structure or the like is to be assembled from a number of such sheet metal pieces. Once the lead edge E of sheet A enters the means 24, 25, they grip the sheet and propel it along therethrough while acting thereon. The means 25 is shown schematically as a conventional type Pittsburg machine in FIG. 4, having a plurality of rollers 80 of varying shape which engage the edge of a sheet A passing therethrough and gradually bend the edge until it has the desired configuration for engagement with corresponding metal pieces when a structure is to be constructed therewith. When a quarter-inch machine is used, of course the last quarter-inch of the longitudinal edges F are merely bent 90° with respect to the rest of the wrapper C by conventional rollers or the like. Any variety of edge deforming means 24, 25 and rollers 80 and the like may be employed, depending upon the requirements of the given situation. Each of the means 24, 25 is mounted for linear movement substantially in the y-dimension, such as by a plurality of rotatable screw rods 81 powered by motors 82, which rods 81 each engage a portion of the body 83 for means 24, 25 which portion converts rotary motion of the rods 81 into linear movement of the body 83. The motors 82 are also controlled by the computer control means 20 or the like.

Figure 5:
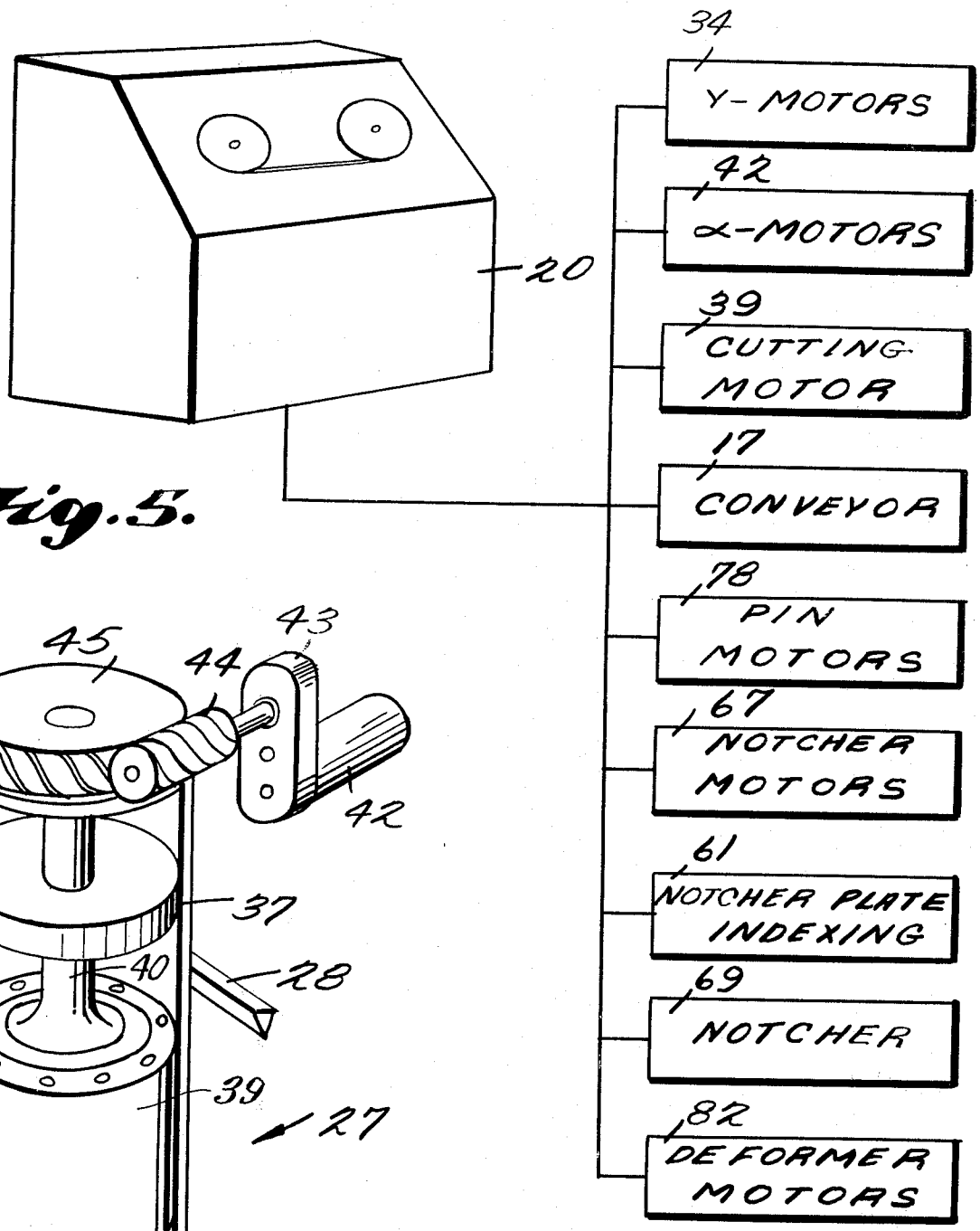
FIG. 5 is a schematic view of an exemplary control system according to the present invention.

A schematic of various wrappers that may be cut from sheets A is shown in FIG. 6, having longitudinal edges F of the cut wrapper, with any number and arrangement of notches D and deformed edge portions G therein. The exact shape of the wrappers C that are cut utilizing apparatus according to the present invention is controlled by the computer control means 20 or the like, which is shown in operative schematic relationship with other elements of the apparatus according to the present invention in FIG. 5. The computer control means 20 or the like can be any sort of control apparatus that is capable of providing the necessary correlation of control between the various components of the apparatus of the present invention, but as shown in FIG. 5, it is of the type having a magnetic tape input, which tape has control information associated therewith corresponding to the type of wrappers that are to be cut.

In operation of the invention according to the method of the present invention, the leading edge E of a metal sheet A is fed by conveyor belt(s) 70 into operative association with the left and right hand cutting assemblies 12, 14. The y-position and the angular orientation of the blades 46, 47 of the cutting assemblies 12, 14 are predetermined by computer 20 control of the y-motors 34 and the α-motors 42, the blades 46, 47 being operated in cutting motion by cutting motor 39. No damage is done to the belt(s) 70 since the supporting members 71 space the sheet A from the conveyor belt(s) 70, which members 71 are deflected by portion 50 of cutting assemblies 12, 14. Waste B cut from sheet A falls on either side of the wrapper C being cut, and the sheet A continues onwardly in the x-direction carried by conveyor means 16. Computer 20 or the like controls the notcher motors 67 so that the longitudinal edges F of the wrappers C are in operative relationship with the notcher plates 55, 56. The correct punch die 59 is selected by controlling motor 61, and the punch 64 is operated. The conveyor means 16 can be temporarily stopped (controlled by computer 20) during punching if desired, however, it is contemplated that punching with notcher 64 will be rapid enough that no interference with smooth operation of the apparatus 10 will occur if notching takes place during continuous operation of conveyor means. Once past the notchers 22, 23, the leading edge E of sheet A moves off the conveyor belt(s) 70 into operative relationship with the edge deforming means 24, 25, which have been moved by computer 20 control of motors 82 into proper position to act on the longitudinal edges F of the cut wrappers C. After edge deformation of the wrappers C, the wrappers are ready for any ultimate use to which they might be put.

While the invention has been herein shown and described in what is presently considered to be the most practical and preferred embodiment thereof, it will be apparent to those of ordinary skill in the art that many modifications may be made thereof within the scope of the invention, which scope is to be accorded the broadest interpretation of the appended claims so as to encompass all equivalent structures and methods.

What is claimed is:

1. Apparatus for cutting wrappers and the like from metal sheets, comprising a. conveyor means for continuously feeding a metal sheet into a cutting position, and past said cutting position, in a given direction x, b. a pair of powered cutting means for cutting said metal sheet along the length thereof as it is fed to said cutting position, each of said cutting means comprises a scissors-like shearing cutting blade arrangement, one of said cutting blade arrangements being a right-hand cutting blade arrangement, and the other of the cutting blade arrangements being a left-hand cutting blade arrangement, c. means for mounting said cutting means for movement in a y-dimension, said y-dimension being generally perpendicular to said x direction, d. y-motor means for selectively moving said cutting means in said y-dimension, e. means for mounting said cutting means for rotation about a generally vertical axis, said axis being generally perpendicular to a plane containing said y-dimension and x-direction, f. α-motor means for rotating said cutting means about said axis of rotation, g. means for spacing said metal sheet to be cut from said conveyor means so that said conveyor means is not damaged by said cutting means during cutting therewith, h. computer control means or the like for controlling said y and α motor means to cut wrappers or the like of desired shape and dimension from said metal sheet.

2. Apparatus as recited in claim 1 further comprising notching means for notching the longitudinal edges of said metal sheet after it is cut by said cutting means.

3. Apparatus as recited in claim 2 wherein said notching means includes a pair of vertically spaced plates for receiving said metal sheet therebetween, and a die in operative association with the top plate, and a punch for moving said die from said top plate through said metal sheet to notch an edge of said cut metal sheet, means for mounting said notching means for movement in the y-dimension, and notcher motor means for moving said notching means in said y-dimension toward and away from a longitudinal edge of said cut metal sheet, said computer control means or the like also controlling said notcher motor and coordinating operation thereof with said cutter y and α motors.

4. Apparatus as recited in claim 3 further comprising a plurality of dies associated with said notching means, and means for moving said dies into operative position with said punch means to punch notches of various shapes and dimension in said metal sheet.

5. Apparatus as recited in claim 2 further comprising means for selectively deforming the longitudinal edges of said cut metal sheet to provide for interlocking thereof with similar deformations on other metal sheets.

6. Apparatus as recited in claim 5 further comprising means mounting said edge deforming means for guided movement in said y-dimension, and motor means for moving said edge deforming means in said y-dimension, said motor means being controlled by said computer means or the like.

7. Apparatus as recited in claim 1 further comprising means for guiding exterior side portions of said metal sheet cut off from the main portion of said metal sheet away from the main portion of said metal sheet while said metal sheet is further conveyed by said conveying means.

8. Apparatus as recited in claim 1 wherein said conveying means comprises at least one conveyor belt, and wherein said means for spacing said metal sheet from said conveyor means comprises a plurality of resilient elongated upstanding members attached to said conveyor belt and upstanding therefrom.

9. Apparatus as recited in claim 1 wherein said means for mounting each of said cutting means for movement in the y-dimension includes a rotatable screw elongated in the y-dimension, and means directly connected to said cutting means for receiving said rotatable screw therein to convert the rotational movement of the screw into linear movement of said cutting means in the y-dimension.

10. A method for automatically cutting wrappers or the like from metal sheets, comprising the steps of conveying a metal sheet in a given direction x into a cutting position, simultaneously cutting opposed side portions from said metal sheet at said cutting position to form longitudinal cut edges of a wrapper or the like, said cutting being accomplished by shearing said metal sheet, a blade being disposed above said metal sheet and a blade being disposed below said metal sheet at said cutting position, said blades moving toward each other during cutting to provide scissors-like shearing of metal sheet, and automatically conveying said cut wrapper past said cutting position in the x-direction while cutting of said wrapper or the like from said metal sheet continues.

11. A method as recited in claim 10 comprising the further step of automatically notching the cut longitudinal edges of said wrapper or the like after it is moved from said cutting position in said x-direction at a notching position.

12. A method as recited in claim 11 comprising the further step of automatically conveying in the x-direction said cut wrapper or the like from said notching position to an edge deforming position, and automatically deforming longitudinal edge portions of said cut wrapper or the like at said edge deforming position while substantially continuously conveying said wrapper or the like from said notching position in the x-direction.

13. A method as recited in claim 10 comprising the further step of automatically conveying in the x-direction said cut wrapper or the like from said cutting position to an edge deforming position, and automatically deforming longitudinal edge portions of said cut wrapper or the like at said edge deforming position while continuously conveying said wrapper or the like from said cutting position in the x-direction.

*14. A method for automatically cutting wrappers or the like from metal sheets utilizing a pair of cutting devices mounted for movement in a given horizontal direction Y, and for movement with respect to each other in the direction Y, the operation, and position in the direction Y, of each of the cutting devices being automatically controlled; said method comprising the steps of*

*(a) conveying a metal or the like sheet in a given horizontal direction X toward the cutting devices, the direction X being substantially perpendicular to the direction Y;*

*(b) automatically controlling the operation and position in direction Y of each of the cutting devices to simultaneously form longitudinal edges of a wrapper or the like, at least one of the longitudinal edges being non-parallel to both the directions X and Y; and*

*(c) automatically conveying the cut wrapper or the like past the cutting devices in the X direction while cutting of the wrapper or the like continues.*

*15. A method as recited in claim 14 wherein step (b) is practiced so that both of the longitudinal edges of the wrapper or the like are non-parallel to the directions X and Y.*

*16. A method as recited in claim 15 wherein step (b) is practiced so that the longitudinal edges of the wrapper or the like being cut are parallel to each other.*

*17. A method as recited in claim 15 wherein step (b) is practiced so that the cutting devices are originally close together but are moved further apart in the direction Y as cutting of the wrapper or the like edges continues.*

*18. A method as recited in claim 15 wherein step (b) is practiced so that the cutting devices are far apart but are moved toward each other in the direction Y as cutting of the wrapper or the like edges continues.*

*19. A method as recited in claim 14 comprising the further step of automatically notching the cut longitudinal edges of the wrapper or the like after it is moved past the cutting devices in the X-direction.*

*20. A method as recited in claim 14 comprising the further step of automatically conveying the cut wrapper or the like in the X-direction from the cutting devices to an edge deforming device, and automatically deforming longitudinal edge portions of the cut wrapper or the like with the edge deforming device.*

* * * * *